United States Patent
Boucadair et al.

(10) Patent No.: US 9,225,752 B2
(45) Date of Patent: Dec. 29, 2015

(54) SERVICE CONTINUITY MANAGEMENT IN A NETWORK

(75) Inventors: Mohamed Boucadair, Rennes (FR); Yoann Noisette, May sur Orne (FR)

(73) Assignee: Orange, Paris (FR)

(*) Notice: Subject to any disclaimer, the term of this patent is extended or adjusted under 35 U.S.C. 154(b) by 1321 days.

(21) Appl. No.: 12/525,725

(22) PCT Filed: Jan. 29, 2008

(86) PCT No.: PCT/FR2008/050141
§ 371 (c)(1),
(2), (4) Date: Aug. 4, 2009

(87) PCT Pub. No.: WO2008/110714
PCT Pub. Date: Sep. 18, 2008

(65) Prior Publication Data
US 2010/0074249 A1    Mar. 25, 2010

(30) Foreign Application Priority Data
Feb. 6, 2007  (FR) ...................................... 07 00831

(51) Int. Cl.
*H04L 29/06*  (2006.01)
(52) U.S. Cl.
CPC ........ *H04L 65/1046* (2013.01); *H04L 65/1069* (2013.01)
(58) Field of Classification Search
None
See application file for complete search history.

(56) References Cited

U.S. PATENT DOCUMENTS

| | | | |
|---|---|---|---|
| 6,973,027 B1 | 12/2005 | Shaffer et al. | |
| 7,626,979 B1* | 12/2009 | Bugenhagen et al. | 370/352 |
| 7,861,003 B2* | 12/2010 | Mallesan | 709/239 |
| 8,014,298 B1* | 9/2011 | Schlesener | 370/242 |
| 8,204,043 B2* | 6/2012 | Bhatia et al. | 370/352 |
| 8,243,718 B2* | 8/2012 | L'Anson | 370/352 |
| 2006/0050628 A1* | 3/2006 | Ng et al. | 370/216 |
| 2006/0067227 A1* | 3/2006 | Batni et al. | 370/235 |
| 2007/0002764 A1 | 1/2007 | Papadimitriou | |
| 2007/0008882 A1 | 1/2007 | Oran | |
| 2008/0043659 A1* | 2/2008 | Richards et al. | 370/313 |
| 2008/0144605 A1* | 6/2008 | Qiu et al. | 370/352 |
| 2008/0198764 A1* | 8/2008 | Keller | 370/254 |

OTHER PUBLICATIONS

Camarillo et al., "Requirements from SIP (Session Initiation Protocol) Session Border Control Deployments, draft-camarillo-sipping-sbc-funcs-04.txt," Sipping Working Group, Internet-Draft, pp. 1-21 (Jun. 8, 2006).

(Continued)

*Primary Examiner* — Gregory Sefcheck
(74) *Attorney, Agent, or Firm* — Drinker Biddle & Reath LLP

(57) ABSTRACT

A service is provided to a user of a terminal in a network, comprising a service platform and network equipment including session border controllers. Each of the controllers is capable of communicating with the service platform. At least one given session border controller is capable of routing messages received from the terminal, intended for the service platform. This controller decides that the service platform is not accessible on the basis of an accessibility check (302) and then operates in an autonomous operating mode (303, 310) according to which the controller selects a network equipment separate from the service platform and routes at least one message received from the terminal to said selected network equipment.

6 Claims, 2 Drawing Sheets

(56) References Cited

OTHER PUBLICATIONS

Hardwick, "Session Border Controllers—Enabling the VoIP Revolution," retrieved from internet website: http://www.dataconnection.com/network/download/whitepapers/sessionbordercontroller.pdf, pp. 1-51 (Feb. 2005).

Spencer et al., "IAX2: Inter-Asterisk eXchange, Version 2, draft-guy-iax-02, Work in Progress," Internet-Draft, pp. 1-98 (Oct. 23, 2006).
European Telecommunications Standards Institute (ETSI), "Interconnect and routing issues related to NN&A for NGNs TISPAN," ETSI, pp. 1-34 (Sep. 6, 2006).
UZELAC, "SIP Peering Use Case for VSPs draft-uzelac-speermint-use-cases-00.txt," IETF, pp. 1-13 (Oct. 16, 2006).

* cited by examiner

SERVICE CONTINUITY MANAGEMENT IN A NETWORK

CROSS-REFERENCE TO RELATED APPLICATIONS

This application is the U.S. national phase of the International Patent Application No. PCT/FR2008/050141 filed Jan. 29, 2008, which claims the benefit of French Application No. 07 00831 filed Feb. 6, 2007, the entire content of which is incorporated herein by reference.

BACKGROUND OF THE INVENTION

The present invention relates to a service on IP (Internet Protocol), in particular to IP telephony called "Voice over IP".

IP telephony advantageously allows, on the one hand, a reduction of the cost of telephonic communications in comparison with conventional telephony and, on the other hand, the coupling of telephony with the functions and services of data processing and of IP networks.

A telephony service is a real time service which requires a relatively high level of availability, robustness and resistance to failure. In the context of conventional telephony (STN for 'Switched Telephone Network'), based on circuit switching, this level of robustness and availability is obtained by the use of methods which are not applicable to IP telephony, which is not based on circuit switching.

An IP network offering a telephony service conventionally comprises a service platform, as well as equipment for accessing the service, or POPs (Points Of Presence), which are in charge of managing the access of user client terminals to the service in question.

In a standard fashion, these POPs are associated with Border Session Controller (BSC) equipment (also known as Session Border Controller (SBC) equipment), whose principal functions have been identified in the document 'Requirements from Session Initiation Protocol Session Border Control Deployments', by Camarillo et al., draft-ietf-sipping-sbc-funcs, November 2006. These SBCs are situated between the client terminals and the platforms of the IP telephony service. An SBC is in general situated in a POP for access to the IP network (without this however being a necessary condition for the functioning of the telephony service) and represents, for a given client terminal, a unique point of entry to the telephony service. Such management of access to a service makes it possible to mask the service platform and, more generally, the network architecture used by an operator, from the client terminals. It is then possible to guarantee service impregnability.

SBCs correspond to a point of passage both for the signalling flows, aimed at establishing a communication, and for the media flows which pass between the client terminals. The signalling flows can be for the establishment of a communication, for example on the basis of protocols such as SIP (Session Initiation Protocol), or H.323, such as defined by the ITU-T (International Telecommunication Union Telecommunication Standardization Section), or IAX (Inter-Asterisk eXchange Version 2) such as defined in the document draft-guy-iax-02, Work In Progress, October 2006 by Spencer, Shumard, Capouch and Guy. As for the media flows, these can be exchanged between client terminals according to protocols of the RTP (Real-Time Transport Protocol) type, or of the IAX type for example.

An SBC therefore receives, on the one hand, signalling messages from the service platform, or from the client terminals respectively. Then, after processing these messages, the SBC relays them to the final client terminals, or respectively to the service platform.

Then, when a media flow is exchanged from a first client terminal to a second client terminal used by a client of the service, which are associated with a first and a second SBC respectively, this media flow is received at the first SBC, then relayed to the second SBC, the latter then being in charge of transmitting this media flow to the second client terminal. By proceeding thus, the client terminals cannot communicate directly with each other, the impregnability of service being thus being guaranteed.

It can also be noted that the SBCs can also provide other functions such as a filtering function or an address translation function for services based on the IPv4 (version 4) protocol.

When an SBC can no longer communicate with the platform, the service offered to the clients of client terminals that it manages is terminated. In order to increase the resistance to failures in such a network, and to transport, in a robust and efficient manner, the signalling messages allowing the establishment of the communications as well as the transport of the media flows between the client terminals, it is possible to provide a redundancy of the elements of the service platform in the form of backup elements, such that it is possible to substitute a backup element for a defective element of the service platform. Such architecture requires that such a backup element has a configuration and a behaviour that are identical to those of the defective element for which it must be substituted.

However, the provision of such backup equipment for the service platform has many drawbacks. Firstly, the duplication of these elements is costly both at the level of the infrastructure to be set up and at the level of the actual management of the redundancy.

Moreover, such redundancy does not make it possible to overcome, in all circumstances, the consequences of a failure relating to the links between the service platform and the SBCs.

SUMMARY OF THE INVENTION

The purpose of the present invention is to improve the situation.

A first aspect of the present invention proposes a method of managing a service offered to a user of a terminal in a network comprising a service platform and equipment including session border controllers, each of the session border controllers being adapted to communicate with the service platform. At least one given session border controller is adapted for routing messages received from the terminal, intended for the service platform.

The method comprises the following steps at the level of the session border controller:

/a/ deciding that the service platform is not accessible on the basis of an accessibility check; and /b/ operating in an autonomous operating mode in which the given session border controller selects an equipment of the network separate from the service platform and routes at least one message received from the terminal to said selected network equipment.

By proceeding thus, it is possible to guarantee a continuity of the service offered to the user of the terminal, even in the case where the session border controller, which is in charge of managing the terminal in question, has lost access to the service platform. In this case, instead of automatically routing the messages received from the terminal, to the service platform, it selects another equipment of the network in order to continue providing the service to the user of this terminal.

The selected network equipment can advantageously be a session border controller having access to the service platform. Thus, in this case, the message routed to said selected network equipment is transmitted from the selected network equipment to the service platform.

The selected network equipment can then act as a proxy session border controller and thus relay the messages which are normally transmitted from the given session border controller to the service platform.

In an embodiment of the present invention, each session border controller checks the platform accessibility and, in step /b/, the following steps are carried out:
 /b-1/ transmitting a proxy request intended for at least one other session border controller of the network;
 /b-2/ if at least one response to said proxy request is received, selecting, as a proxy, a session border controller from the session border controllers having sent a response.

Thus, in order to select a session border controller as a proxy, the given session border controller interrogates all or some of the other session border controllers of the network. The term 'network' is understood to refer not only to the network layer, i.e. layer 3, of the OSI (Open System Interconnection) model, but also to any interconnection between different equipment.

These session border controllers respond if the service platform appears to them as being accessible on the basis of the accessibility check that they carry out. Then, the session border controller can select a proxy from among the session border controllers which have responded, i.e. from among the session border controllers which have been interrogated and which have access to the service platform.

In an embodiment of the present invention, in step /b/, the session border controller receives a message from the terminal intended for a destination terminal, and the selected network equipment is a session border controller in charge of managing said destination terminal. The messages routed to said selected network equipment are then transmitted from the selected network equipment to the destination terminal.

In this context, a message received from the terminal by the given session controller passes through another session border controller which is the one selected and is then routed to the destination terminal, without passing through the service platform. Such an embodiment can in particular be advantageous in the case where the other session border controllers of the network do have access to the service platform either.

In this case, each session border controller maintains a local database indicating terminals that said session border controller manages, and step /b/ is carried out according to the following steps, at the level of the given session border controller:
 /b-i/ transmitting a destination request message intended for at least one other session border controller;
 /b-ii/ if a response to the destination request is received, selecting the session border controller having sent said response;
a session border controller deciding to transmit a response to the destination request according to the local database.

Thus, as each session border controller locally knows the terminals that it is in charge of managing, according to the information stored in its local database, it is possible for a message received from the terminal not to pass through the service platform.

In a variant, provision is made for combining the above autonomous operating modes.

To this end, it is possible to make provision, if at least one session border controller has access to the service platform, for the selected network equipment to be a session border controller having access to the service platform, the message routed to said selected network equipment being transmitted from the selected network equipment to the service platform; and, otherwise, for the selected network equipment to be an equipment in charge of managing the destination terminal, the message routed to said selected network equipment being transmitted from the selected network equipment to the destination terminal.

This alternative is advantageous because it makes it possible to prioritize the autonomous operating mode, by proxy, in which the service is still given by the service platform and because of this is identical to that which is provided during a normal operation of the session border controller.

Such an equipment in charge of managing the destination terminal can be a session border controller.

This equipment can also be a service gateway connecting the network to another network. In this case, the given session border controller can have information relative to this service gateway. In step /b/, when the session border controller receives a message from the terminal intended for a destination terminal, said selected network equipment is the service gateway when the destination terminal is managed by said other network.

Thus, it is even possible to provide continuity of the service for a user of a terminal who is seeking to communicate with a destination terminal managed in a network that is different from the one by which the terminal in question is managed.

In this context, the term 'network' can refer to a service domain, the latter in particular being able to correspond to a provision of telephony. Thus, the gateway then makes it possible to connect two different service domains which can respectively correspond to two different provisions of service.

The management method according to an embodiment of the present invention can, moreover, provide for the implementation of the following steps:
 receiving a proxy request;
 if the platform is detected as being accessible, transmitting a response to the proxy request.

Thus the session border controller can also be a proxy controller.

The method can also comprise the implementation of the following steps:
 receiving a destination request indicating a destination terminal;
 determining if said session controller is in charge of managing the destination terminal according to information stored in the local database;
 and, in the affirmative, transmitting a response to the destination request;
the session border controller being adapted for transmitting, to the destination terminal, messages received from another session border controller.

Here, provision can be made for the destination request to indicate the destination terminal by a corresponding telephony identifier.

Thus the session border controller can also act as a destination controller.

Provision can be made for implementing an accessibility check according to the following steps:
 /1/ transmitting a check message to the service platform and starting a timer;
 /2/ checking if a response to the check message is received from the service platform before said timer elapses;

/3/repeating steps /1/and /2/N times, N being a predetermined integer;

/4/if no response is received before the timer elapses for the N times, deciding that the service platform is not accessible.

A second aspect of the present invention proposes a session border controller adapted for implementing a management method according to the first aspect of the present invention.

This session border controller can be adapted for transmitting messages received from the terminal to the service platform and can comprise:

a control unit adapted to decide that the service platform is not accessible on the basis of an accessibility check; and an operating mode management unit adapted in order to switch into an autonomous operating mode, according to a decision taken by the control unit, in which the session border controller selects an equipment of the network separate from the platform and routes at least one message received from the terminal to said selected equipment of the network.

A third aspect of the present invention proposes a service platform in a network offering a service to a user of a terminal, said network moreover comprising session border controllers, each one being adapted for communicating with the service platform, said service platform being adapted for responding to an accessibility check message received from a session border controller.

A fourth aspect of the present invention proposes a service gateway in a first network offering a service to a user of a terminal and in a second network, said first network moreover comprising session border controllers, each one being adapted for communicating with the service platform, said service gateway being adapted for:

receiving a destination request indicating a destination terminal; and responding to said destination request if the destination terminal is managed in said second network.

A fifth aspect of the present invention proposes a computer program intended to be installed in a session controller according to the second aspect of the present invention, comprising instructions able to implement the method according to the first aspect of the present invention, during an execution of the program by processing means of the session controller.

A sixth aspect of the present invention proposes a recoding medium, which can be read by a computer, on which the computer program according to the fifth aspect is stored.

A seventh aspect of the present invention proposes a computer program intended to be installed in a service platform according to the third aspect of the present invention, comprising instructions able to implement the method according to the first aspect, during an execution of the program by processing means of the service platform.

An eighth aspect of the present invention proposes a recoding medium, which can be read by a computer, on which the computer program according to the seventh aspect is stored.

BRIEF DESCRIPTION OF THE DRAWINGS

The invention will also be better understood with the help of the drawings, in which.

DETAILED DESCRIPTION

Figure 1:
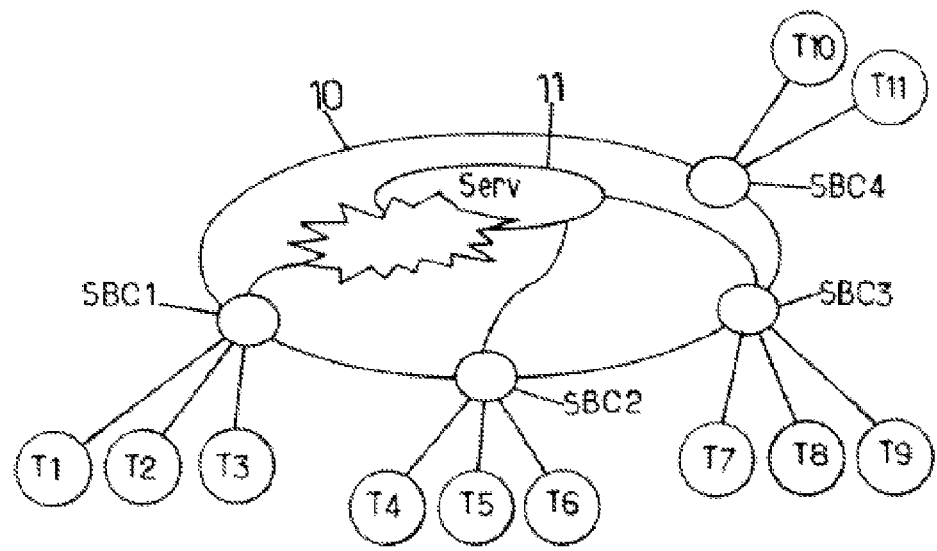
FIG. 1 illustrates a network composed of IP telephony service elements according to an embodiment of the present invention.

In order to guarantee continuity of service even when exchanges between an SBC and the service platform are no longer possible, and to do so no matter what the origin of the problem affecting these exchanges may be, provision is made for an SBC to be able to operate either in a normal operating mode, which corresponds to the case where the service platform is accessible from it and in which the messages between two terminals pass via the service platform, or in an autonomous operating mode, which corresponds with the case where the service platform is not accessible from it.

In the case where the service platform is accessible from this SBC, the messages received from the client terminals are relayed to the service platform which is in charge of implementing the telephonic routing of these messages.

The expression "autonomous operating mode" is understood to mean an operating mode of the SBC in which the routing of the messages received from its client terminals is implemented at the level of the SBC itself and not at the level of the service platform.

The switchover from a normal operating mode to an autonomous operating mode is carried out according to the accessibility status of the platform for the SBC in question. To this end, provision is made for an SBC to have means of checking its platform accessibility status.

When the access of this SBC to the service platform is detected as being faulty, the SBC then switches into an autonomous operating mode. Then, when the service platform is again detected as being accessible, the SBC can return to a normal operating mode.

An SBC can check the accessibility status of the service platform by transmitting a check message of the "keepalive" type. Such a message can be transmitted at a specified frequency. No limitation is placed on the method of sending these check messages, nor to the frequency at which they are sent.

The SBC then preferably manages a timer set to the period of waiting for a response from that service platform.

When the SBC is in normal operating mode, the timer can be started on sending the check message. Then, when the timer elapses before a response is received from the service platform, the SBC can decide to switch into the autonomous operating mode.

It is also possible to make provision for the switchover in the autonomous operating mode to be triggered only when a whole number N of check messages are sent successively to the service platform without the latter having responded before the associated timer has elapsed. This number N can therefore be determined according to the frequency at which the successive check messages are sent.

A service platform of this type comprises different operational elements. Such a check message can be received by these different operational elements of the service platform, and all or some of these operational elements are then able to respond to the check messages from the SBC.

The accessibility status of these elements can be determined for example on the basis of traces of the SNMP (Simple Network Management Protocol) type or on the basis of alarms and notifications coming from operational elements of the service platform. The method used for determining the accessibility status of the service platform is not described in detail here, and no limitation is placed on it.

When the SBC is in autonomous operating mode, it can be advantageous to also use a method of detection of accessibility to the service platform, in order to be able to manage the switching into the normal operating mode in the case where the platform is again detected as being accessible.

To this end, the same accessibility test method can be used both in the case where the SBC is in normal operating mode and in the case where the SBC is in autonomous operating mode.

Thus, in the case where the SBC is operating in autonomous operating mode, a timer can be started on sending a test message. Then, when a response is received from the service platform before the timer elapses, the SBC can decide to switch into the normal operating mode.

In the same way as for the detection of the loss of access to the platform such as described above, the reestablishment can be considered effective only after one or more responses to the successively sent test messages, each one being received before the timer elapses. When the access to the service platform is re-established, the SBC then switches over into the normal operating mode.

It is appropriate however, in order to guarantee a certain level of quality for the service offered, to ensure that this switchover to normal operating mode takes place smoothly and without interruption.

It can therefore be advantageous for the SBC to continue to manage the sessions which have been established in the autonomous operating mode of the SBC, and which are still in progress at the time when the SBC switches over into the normal operating mode, until these sessions are terminated.

The accessibility test is carried out at the level of the SBC in question and does not mean that the service platform itself is no longer operational, even if that may be the origin of a loss of access to the service platform for this SBC.

The autonomous operating mode of an SBC implies that the latter is no longer, as in the normal operating mode, automatically routing the messages received from a client terminal to the service platform. The routing of these messages is then managed at the level of the SBC which is operating in autonomous mode.

In an autonomous mode, provision can be made for the SBC in question to nevertheless try to transmit the messages received from a client terminal to the service platform by means of another SBC of the network which itself has access to the service platform. In fact, it is possible that the service platform is only detected as being inaccessible by one or some of the SBCs of the network, and that it remains accessible for others. This can be the case when the detected inaccessibility statuses result from localized network connection problems.

In these conditions, provision can be made for the SBC to try to elect a proxy SBC from among those which have access to the service platform, by means of which it would then be able to access this service platform.

Thus, an embodiment of the present invention proposes a collaborative operating mode. To this end, provision is made for the SBCs to be able to communicate with each other on the basis of a protocol, which can be a dedicated protocol, in particular by exchanges of the point-multipoint type or of the 'anycast' type, i.e. when several SBCs have the same address, the SBC closest to the source transmitting traffic to this address receiving this traffic.

No limitation is placed on the present invention with regard to the inter-SBC communication mode used.

Hereafter, by way of example, the present invention is described in its application to an inter-SBC protocol based on a general broadcast mode or "multicast" mode. Thus, the inter-SBC exchanges are then carried out on the basis of groups with several destinations, a group potentially being able to contain all the SBCs of the network in question. In these conditions, a message sent to this group is then received by all the SBCs.

For example, provision can be made such that, on start-up, all of the SBCs of the network, which can be a telephone network, belong to a given multicast group G, identified by a specific IP address.

Then, on detection of the inaccessibility of the service platform for an SBC, the latter sends a proxy request, a message of the SBC_PROXY type, to the specific IP address of the multicast group G, in order to determine if at least one SBC of the group is linked with the service platform.

On reception of this proxy search message, the SBCs of this group then inform the SBC that has sent this message, regarding their accessibility to the service platform status.

No limitation is placed on the present invention with the regard to the mechanism used for transmitting information relating to an accessibility of the service platform status from one SBC to another SBC.

In particular provision can be made, to this end, such that an SBC responds to this proxy search message only if it has access to the service platform and that, because of this, an absence of response means that this access is impossible. In these conditions, the SBC sending the request message can start a timer. Then, when the timer expires before a response has been received, the transmitting SBC concludes from this that none of the destination SBCs can be a proxy SBC.

When an SBC of the group G has detected the service platform as being accessible, it then transmits a response to the transmitting SBC. This response can be transmitted in unicast mode by a message of 'ACKNOWLEDGE' type.

In the case where one or more responses have been received, the transmitting SBC can make use of a proxy SBC. If several SBCs of the group G have responded, it can even select one according to selection criteria, no limitation being placed on the present invention with the regard to such selection criteria.

A proxy SBC is in charge of relaying the messages which pass through the transmitting SBC to the service platform, the latter then being able to process these messages as though they had come to it from the transmitting SBC.

In the case where, when the timer has elapsed, no response has been received, or also in the case where a specified number N of successively sent proxy search messages have remained without response, the SBC cannot then have the use of a proxy SBC.

In an embodiment, the service platform can also itself be notified of this configuration, in particular for the needs of consistency of service or security. However, this notification is optional In such a case, provision can advantageously be made for the transmitting SBC to then switch into a local operating mode in which it is substituted for the service platform for at least a part of the functions that the latter provides for the client terminals clients which are linked with the SBC in question.

To this end, in order to allow an SBC to implement at least some functions of the service platform, i.e. in order that an SBC has the ability to operate, in a local operating mode, client terminals whose access is managed by the POP to which it is linked, this SBC can make use of a database in which are also stored at least a part of the registration data relating to these client terminals.

A client terminal proceeds to a registration phase during which it transmits to the network, i.e. to the SBC which is in charge of its management, a registration message containing registration data which allows the network to provide the service in question. In a normal operating mode, this message is received at the level of the SBC linked with the POP managing the access of the client terminal user to the service, which can be a telephony service. This SBC relays this message to the service platform which updates a database storing this registration data.

Thus, as such a registration message passes through the SBC, because of its function in the architecture of the network in question, the local database can advantageously be easily updated.

In such conditions, on the basis of the data thus stored, the SBC can be at least partly substituted for the service platform for the client terminals of which it is in charge, since it has registration data which in particular allows it to contact these client terminals. The SBC can then in particular respond to the requests for establishing calls to the client terminals of which it is in charge.

Moreover, this registration data is up to date, since it is extracted from the exchanges which are conventionally carried out between the service platform and the client terminals.

It is appropriate to note that when the last registration of the client terminals has taken place before the switchover into local operating mode, it is not easy to guarantee that the registration data stored in the database of the service platform is data that is up to date when the latter is again accessible for the SBC.

Moreover, the client terminals which are registered during the period when the SBC is operating in local operating mode are not known by the service platform.

As a result, when the service platform is again detected as being accessible from the SBC in question, the latter retransmits to the service platform all of the registration requests from all of the client terminals which are managed in local operating mode.

Such an embodiment makes it possible to guarantee that the service platform has updated registration data for the client terminals which have sent such registration requests.

Then, any communication or session which is initiated after the switchover into local operating mode is processed in a conventional manner, and, because of this, the database of the service platform is correctly updated thereafter.

An autonomous operating mode can therefore correspond either to the collaborative operating mode, or to the local operating mode.

Provision can also be made such that, when the SBC switches over from a normal operating mode to an autonomous operating mode, it first attempts to switch over into a collaborative operating mode in which it accesses the service platform via a proxy SBC and then, in the case where this collaborative operating mode is not possible, the SBC then switches into the local operating mode. This can be the case, in particular, when the service platform is not operational or when the SBC in question cannot exchange information with the other SBCs of the network.

It is therefore preferable that all or part of the SBCs keep respective local databases updated in order to anticipate a possible switchover into a local operating mode.

In a variant, provision can be made for the SBC to switch over into the local operating mode as soon as a loss of platform accessibility is detected, without seeking to select a proxy SBC.

It is also possible to provide for the SBC only to be able to switch over into a collaborative operating mode and, in this case, the management of a local database at the SBC is not required.

FIG. 1 illustrates a network according to an embodiment of the present invention. This network 10 comprises four SBCs, SBC1, SBC2, SBC3 and SBC4, which are adapted for communicating with a service platform Serv 11. SBC 1 is in charge of managing the client terminals T1 to T3, SBC 2 the client terminals T4 to T6, SBC 3 the client terminals T7 to T9, and SBC 4 the client terminals T10 and T11.

SBC1 detects that the service platform is not accessible. It tries to switch into the autonomous operating mode which is, by priority, the collaborative operating mode. To this end, its sends a proxy request SBC_PROXY in broadcast mode to the group of SBCs comprising SBC2, SBC3 and SBC4.

SBC2, SBC3, and SBC4 respond to this SBC_PROXY message by sending messages of the 'ACKNOWLEDGE' type to SBC1 in order to inform it that, from their point of view, the service platform is accessible and operational.

SBC1 can then choose, an SBC as a Proxy SBC, from the group SBC2, SBC3 and SBC4. If SBC3 is selected as the proxy SBC of SBC1, all the signalling messages received by SBC1 are transmitted to SBC3, the latter, in its turn, transmitting them to the service platform 11.

If no SBC responds to the SBC_PROXY message, SBC1 then operates in local operating mode.

In the local operating mode, on reception of a call establishment request, such as a message of the 'INVITE' type according to the SIP (Session Initiation Protocol) protocol, the SBC tries to complete the call without recourse to the service platform.

To this end, it sends a destination request to all or some of the SBCs of the network with the objective of determining which SBC is in charge of the destination client terminal of the signalling message received. No limitation is placed on the protocol used for transmitting such a destination request.

In a first case, the destination client terminal of the call initiation message is managed by the SBC which has received the call initiation request and which is therefore operating in the local operating mode. In this case, the processing of the request is carried out at the level of this SBC, which therefore in this case provides the call routing functions.

To this end, this SBC can check that data relative to this destination client is stored in its local database, either before the sending of the destination request, or in parallel with the sending of this request to the SBCs.

Provision can also be made for the SBC to send a destination request to the group of SBCs to which it belongs and, because of this, it receives this request and processes it like the other SBCs by responding to it favourably in the case where the this SBC is in charge of the destination client terminal.

In a second case, an SBC other than the one which receives the call establishment request manages the destination client terminal of this request, this other SBC, on reception of the destination request, checks if it is in charge of the destination client terminal on the basis of the data stored in its local database. If this is not the case, this SBC preferably does not transmit any negative response, the absence of response representing this information.

In the case where this other SBC is in charge of this destination client terminal, the latter then responds to the SBC sending the destination request. It must in particular provide, in response, information which allows the transmitting SBC to transmit to it the call initiation request received from its client terminal.

This other SBC then behaves like a node of the service platform dedicated to call routing.

On reception of the response to its destination request, the SBC then transmits the received call initiation request to the destination SBC. Then, the processing of the call can be managed on the basis of the fact that the messages exchanged between the terminals pass between the two SBCs.

In a third case, the destination client terminal is not known to any of the SBCs having received the destination SBC request. Such can be the case when the destination client terminal belongs to another IP domain. In this case, the call initiation request can then be routed to a signalling gateway making it possible to access a remote service.

It is then possible to make provision for the information relative to such a signalling gateway to be configured at the level of each SBC. To this end, it is possible to use FQDN (Fully Qualified Domain Name) addresses in order to have great flexibility. When the transmitting SBC has not received any positive response positive to its destination SBC request and/or the destination client terminal is not present in its database, the latter can then transmit the call initiation request to the signalling gateway in order for it to relay this message to the appropriate external service in order to be processed.

It is also possible to make provision for the signalling gateway to be part of the multicast group G identified by the specific IP address. The gateway is then in charge of responding positively to any destination request that it receives and which relates to a domain for which it provides interoperability.

It is appropriate to note that, in the case where the signalling gateway is part of the multicast group G, it is preferable that it does not respond to proxy requests. However, it can be adapted for transmitting messages of this type if it loses its own access to the service platform.

In the case where the service platform is no longer operational, all of the SBCs detect a loss of accessibility to it.

Figure 2:
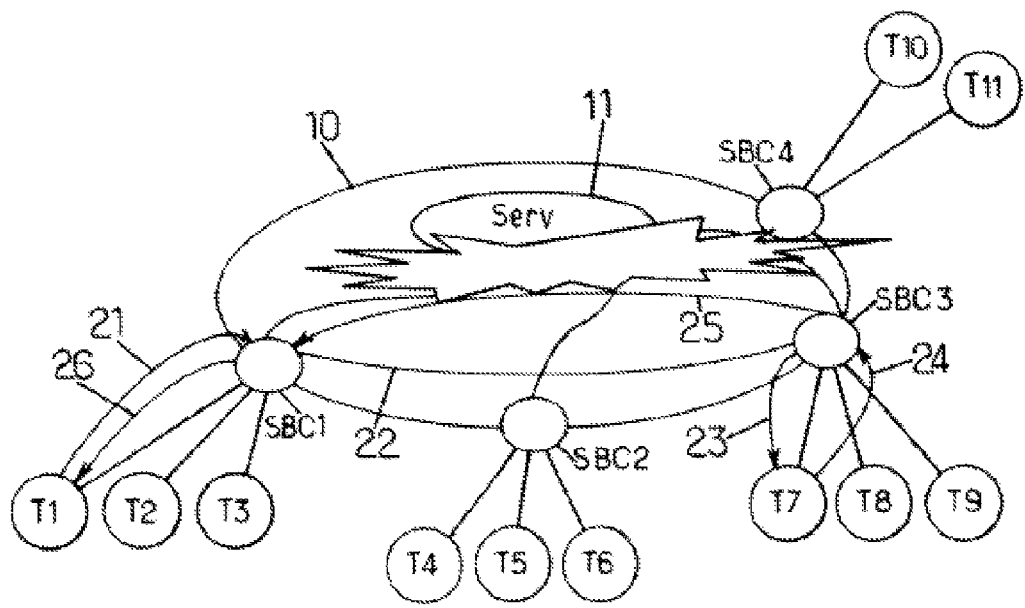
FIG. 2 illustrates a management of an inaccessibility of the service platform from a session border controller according to an embodiment of the present invention.

FIG. 2 illustrates management of an inaccessibility of the service platform from a session border controller according to an embodiment of the present invention.

The network 10 is similar to that shown in FIG. 1.

SBC1 has switched over into local operating mode, either directly after detection of loss of the service platform, or after having sent one or more proxy requests without response.

On reception of a call initiation message 21 transmitted by the client terminal T1 intended for the client terminal T7, SBC1 checks that the client terminal T7 is not present in its database, and sends a destination request to the multicast group G, in order to determine by which SBC the client terminal T7 is managed. SBC3 responds positively to this request, by indicating its own contact information. SBC1 transmits to it the call initiation message 22 intended for client terminal T7. SBC3 processes this request and relays it to the client terminal T7 by a message 23. The destination client terminal T7 then responds to SBC3 by a message 24 of the '200 OK' type according to the SIP protocol if the call establishment is managed according to this protocol. SBC 3 then transmits this message 25 to SBC1, the latter processing this response and relaying it to the client terminal T1 in the form of a message 26.

Then, as in a conventional case, the exchanges can then be implemented according to a protocol of the RTP type between the client terminals T1 and T7, these terminals having been unaware of the loss of access to the service platform.

Figure 3:
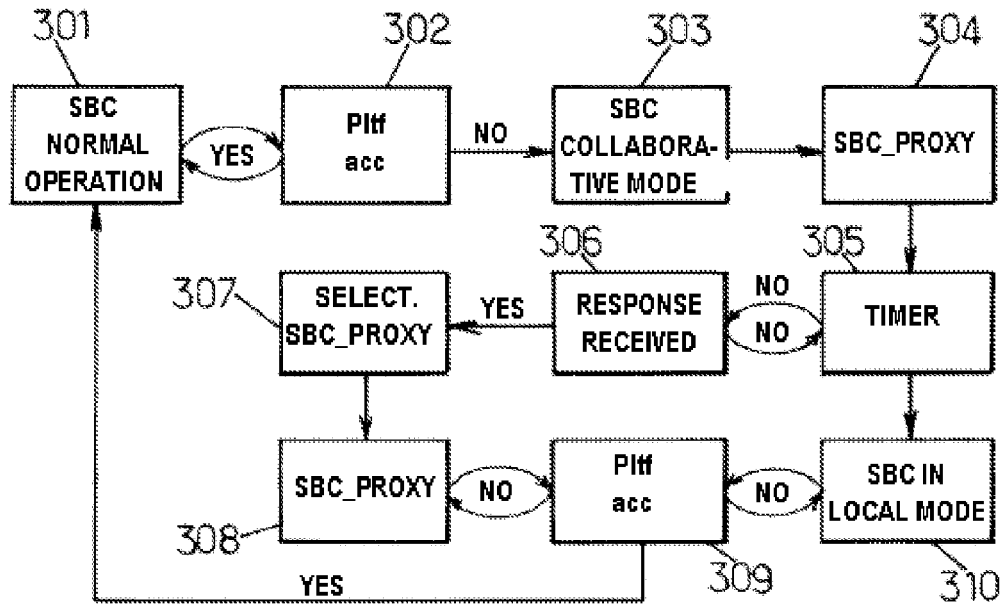
FIG. 3 illustrates a management of a switchover between different operating modes of a session border controller according to an embodiment of the present invention.

FIG. 3 illustrates management of the switchovers between different operating modes according to an embodiment of the present invention.

The SBC in question operates in normal operating mode in a step 301. Then, on the basis of a mechanism such as described above, this SBC regularly checks its accessibility to the service platform status in a step 302. If the platform is detected as being accessible, the SBC remains in the normal operating mode 301.

If the service platform is detected as not being accessible, the SBC switches over into collaborative operating mode in step 303. Then, the SBC sends a proxy request 304 to the different SBCs of the broadcast group in question whilst managing an associated timer such as described above.

When the timer elapses, the SBC checks which SBCs of this group have responded, in step 306.

If no response from the other SBCs has been received when the time has elapsed, the SBC switches over into local operating mode, in step 310.

On the other hand if, in step 306, a response to the proxy search message has been received, the transmitting SBC selects, in step 307, a proxy SBC (referenced SBC Proxy in the figure) from among the SBCs which have responded.

Then, in a step 308, the required processing of the call is carried out via the selected proxy SBC, i.e. the messages received from a client terminal of the transmitting SBC are transmitted to the service platform using the proxy SBC.

When, in a step 309, the service platform is again detected as being accessible from an SBC which is operating either in the collaborative operating mode or in the local operating mode, provision is made for that SBC to then switch over into normal operating mode, in step 301.

Provision can be made for checking the accessibility of the service platform from an SBC regularly or even at a specified frequency.

Figure 4:
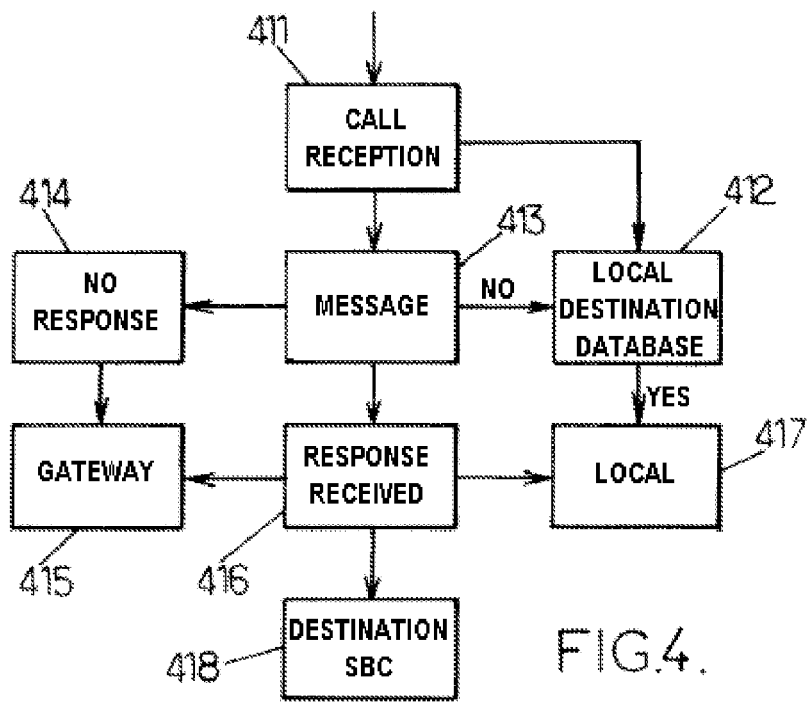
FIG. 4 illustrates a management of call initiation in an autonomous operating mode called "local".

FIG. 4 illustrates a management of call establishment in a local operating mode according to an embodiment of the present invention.

In step 411, a call initiation message is received at an SBC of the network which is operating in local operating mode. In this operating mode, the SBC keeps its local database updated.

On reception of a call establishment request from a client terminal of this SBC, intended for a destination client terminal, the SBC can check in its local database if it is in charge of the destination client terminal, in step 412. If this is the case, the processing of this call can be carried out locally in this SBC. On the other hand, if this is not the case, the SBC sends a destination SBC request to the group of SBCs in step 413.

In an alternative, the SBC can directly interrogate the remote SBCs before checking the data in its local database, by sending a destination SBC request to the group of SBCs concerned and, because of this, this SBC can pass directly from step 411 to step 413.

Then, the SBC can receive a response to this destination SBC request on behalf of at least one SBC of the group in step 416. In this case, the call initiation message is transmitted to the destination SBC which has responded, for processing the call establishment request in a step 416 if the SBC which has responded is the transmitting SBC itself or in step 418 if it is a different SBC.

In the case where no SBC of the broadcast group of the destination SBC request responds, provision can be made, in step 414, for the transmitting SBC to transmit this request to a service gateway. If the latter responds to the destination SBC request, the call establishment request is transmitted to this service gateway for processing in step 415. As described previously, the gateway can also be one of the elements of the network called upon in step 413. A positive response from it (in step 416) will similarly result in the transmission of the call establishment request to this service gateway for processing in step 415.

The invention claimed is:

1. A method of managing a service offered to a user of a terminal in a network, the network having a service platform and equipment including session border controllers that communicate with the service platform, a session border controller routing messages received from the terminal to the service platform, said method comprising the steps of:

deciding at the session border controller that the service platform is not accessible on the basis of a platform accessibility check; and operating in an autonomous operating mode in which the session border controller selects an equipment of the network separate from the service platform and routes at least one message received from the terminal and intended for a destination terminal, to said selected network equipment, in which:

if an other session border controller of a group of session border controllers has access to the service platform, said selected network equipment is the other session border controller having access to the service platform, the message routed to said selected network equipment being transmitted from the selected network equipment to the service platform; and otherwise, if no session border controller of the group of session border controllers has access to the service platform, the selected network equipment is an equipment in charge of managing the destination terminal of said message, the message routed to said selected network equipment being transmitted from the session border controller to the destination terminal without passing through the service platform;

wherein:

each session border controller implements the platform accessibility check and said operating step includes the steps of:

transmitting a proxy request to at least one other session border controller of the network; and if at least one response to said proxy request is received, selecting, as a proxy, a session border controller from the session border controllers having sent a response; and each session border controller maintains a local database indicating terminals that said session border controller manages, and said operating step further includes the steps of:

transmitting a destination request message from said session border controller to at least one other session border controller; and if a response to the destination request is received, selecting the session border controller having sent said response; a session border controller deciding to transmit a response to the destination request according to the local database.

2. A method of managing a service according to claim 1, wherein:

in said operating step, the session border controller receives a message from the terminal intended for a destination terminal;

said selected network equipment is a service gateway connecting said first network to a second network in charge of managing said destination terminal; and the message routed to said selected network equipment being transmitted from the selected network equipment to the destination terminal.

3. A method of managing a service according to claim 1, wherein the platform accessibility check includes the following steps:

transmitting a check message from the session border controller to the service platform and starting a timer;

checking if a response to the check message is received from the service platform before said timer elapses;

repeating said step of transmitting and said step of checking N times, N being a predetermined integer; and if no response is received before the timer elapses for the N times, deciding that the service platform is not accessible.

4. A session border controller in a network offering a service to a user of a terminal, said network having a service platform and other session border controllers, said session border controllers communicating with the service platform, said session border controller transmitting messages received from the terminal to the service platform and comprising:

a control unit that decides that the service platform is not accessible on the basis of platform accessibility check; and an operating mode management unit that switches into an autonomous operating mode, according to a decision taken by the control unit, in which the session border controller selects an equipment of the network separate from the platform and routes at least one message received from the terminal and intended for a destination terminal, to said selected equipment of the network, and:

if an other session border controller of a group of session border controllers has access to the service platform, said selected network equipment is the other session border controller having access to the service platform, the message routed to said selected network equipment being transmitted from the selected network equipment to the service platform; and otherwise, if no session border controller of the group of session border controllers has access to the service platform, the selected network equipment is an equipment in charge of managing the destination terminal, the message routed to said selected network equipment being transmitted from the session border controller to the destination terminal without passing through the service platform;

wherein:

each session border controller implements the platform accessibility check and said operating step includes the steps of:

transmitting a proxy request to at least one other session border controller of the network; and if at least one response to said proxy request is received, selecting, as a proxy, a session border controller from the session border controllers having sent a response; and each session border controller maintains a local database indicating terminals that said session border controller manages, and said operating step further includes the steps of:

transmitting a destination request message from said session border controller to at least one other session border controller; and if a response to the destination request is received, selecting the session border controller having sent said response; a session border controller deciding to transmit a response to the destination request according to the local database.

5. A service gateway in a first network offering a service to a user of a terminal and in a second network, said first network comprising session border controllers in communication with the service platform, said service gateway comprising:
- means for receiving, from a session border controller of the first network, a destination request indicating a destination terminal to which a message received by the session border controller from a terminal belonging to the first network is intended; and
- means for responding to said destination request if the destination terminal is managed in said second network;
- means for receiving said message from the session border controller without passing through the service platform; and
- means for transmitting said message to the destination terminal without passing through the service platform;

wherein:
- each session border controller implements the platform accessibility check and said operating step includes the steps of:
  - transmitting a proxy request to at least one other session border controller of the network; and
  - if at least one response to said proxy request is received, selecting, as a proxy, a session border controller from the session border controllers having sent a response; and
- each session border controller maintains a local database indicating terminals that said session border controller manages, and said operating step further includes the steps of:
  - transmitting a destination request message from said session border controller to at least one other session border controller; and
  - if a response to the destination request is received, selecting the session border controller having sent said response; a session border controller deciding to transmit a response to the destination request according to the local database.

6. A non-transitory computer readable storage medium having computer instructions recorded thereon, the computer instructions configured to perform a method of managing a service offered to a user of a terminal in a network when executed by a session border controller, the network including a service platform and additional session border controllers, the method comprising the steps of:
- deciding at the session border controller that the service platform is not accessible on the basis of a platform accessibility check; and
- operating in an autonomous operating mode in which the session border controller selects an equipment of the network separate from the service platform and routes at least one message received from the terminal and intended for a destination terminal, to said selected network equipment, in which
  - if another session border controller of a group of session border controllers has access to the service platform, said selected network equipment is the other session border controller having access to the service platform, the message routed to said selected network equipment being transmitted from the selected network equipment to the service platform; and
  - otherwise, if no session border controller of the group of session border controllers has access to the service platform, the selected network equipment is an equipment in charge of managing the destination terminal of said message, the message routed to said selected network equipment being transmitted from the session border controller to the destination terminal without passing through the service platform wherein:
- each session border controller implements the platform accessibility check and said operating step includes the steps of:
  - transmitting a proxy request to at least one other session border controller of the network; and
  - if at least one response to said proxy request is received, selecting, as a proxy, a session border controller from the session border controllers having sent a response; and
- each session border controller maintains a local database indicating terminals that said session border controller manages, and said operating step further includes the steps of:
  - transmitting a destination request message from said session border controller to at least one other session border controller; and
  - if a response to the destination request is received, selecting the session border controller having sent said response; a session border controller deciding to transmit a response to the destination request according to the local database.

\* \* \* \* \*